United States Patent
Ding et al.

(10) Patent No.: US 9,659,048 B2
(45) Date of Patent: May 23, 2017

(54) KEY-VALUE DATA STORAGE SYSTEM

(71) Applicant: International Business Machines Corporation, Armonk, NY (US)

(72) Inventors: Jie Ding, Kanagawa (JP); Tatsuyuki Shiomi, Kawasaki (JP); Yoshiko Yaegashi, Tokyo-to (JP); Nobuyuki Yoshifuji, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 14/491,337

(22) Filed: Sep. 19, 2014

(65) Prior Publication Data

US 2015/0127658 A1    May 7, 2015

(30) Foreign Application Priority Data

Nov. 6, 2013  (JP) ................................. 2013-230608

(51) Int. Cl.
 *G06F 7/00* (2006.01)
 *G06F 17/30* (2006.01)

(52) U.S. Cl.
 CPC .. *G06F 17/30336* (2013.01); *G06F 17/30587* (2013.01); *G06F 17/30628* (2013.01)

(58) Field of Classification Search
 CPC ............................................... G06F 17/30628
 See application file for complete search history.

(56) References Cited

U.S. PATENT DOCUMENTS

| 6,578,039 | B1 | 6/2003 | Kawamura |
| 7,284,022 | B2 | 10/2007 | Kawamura |
| 8,832,113 | B2 | 9/2014 | Tamura et al. |
| 2013/0036136 | A1 | 2/2013 | Horii |
| 2013/0054727 | A1 | 2/2013 | Kumano et al. |
| 2013/0066883 | A1* | 3/2013 | Tamura ............ G06F 17/30699 707/747 |
| 2014/0324905 | A1* | 10/2014 | Matsumoto ....... G06F 17/30545 707/770 |

FOREIGN PATENT DOCUMENTS

| JP | 4206586 B2 | 1/2009 | |
| JP | 2013033345 A | 2/2013 | |
| JP | 2013045378 A | 3/2013 | |
| JP | 2013050836 A | 3/2013 | |
| JP | 2013061739 A * | 4/2013 | |
| JP | 2013088920 A | 5/2013 | |
| JP | WO 2013073020 A1 * | 5/2013 | ....... G06F 17/30545 |

* cited by examiner

*Primary Examiner* — Ajith Jacob
(74) *Attorney, Agent, or Firm* — Mark G. Edwards

(57) ABSTRACT

According to an aspect, a key-value store (KVS) system includes a data management unit that stores a data KVS storing a pair of a data KVS key including information on a storage location of application data to be an access target object and the application data; and a key KVS storing a pair of an application key and the data KVS key. The data KVS includes a normal partition in which a size of a record for storing one pair is a predetermined specific size; and a special partition in which the size of the record for storing one pair is a size set according to a data size of the pair to be stored. A data relocation unit relocates a pair of a relocation target object to the special partition having the record size suitable for the data size of the pair.

6 Claims, 13 Drawing Sheets

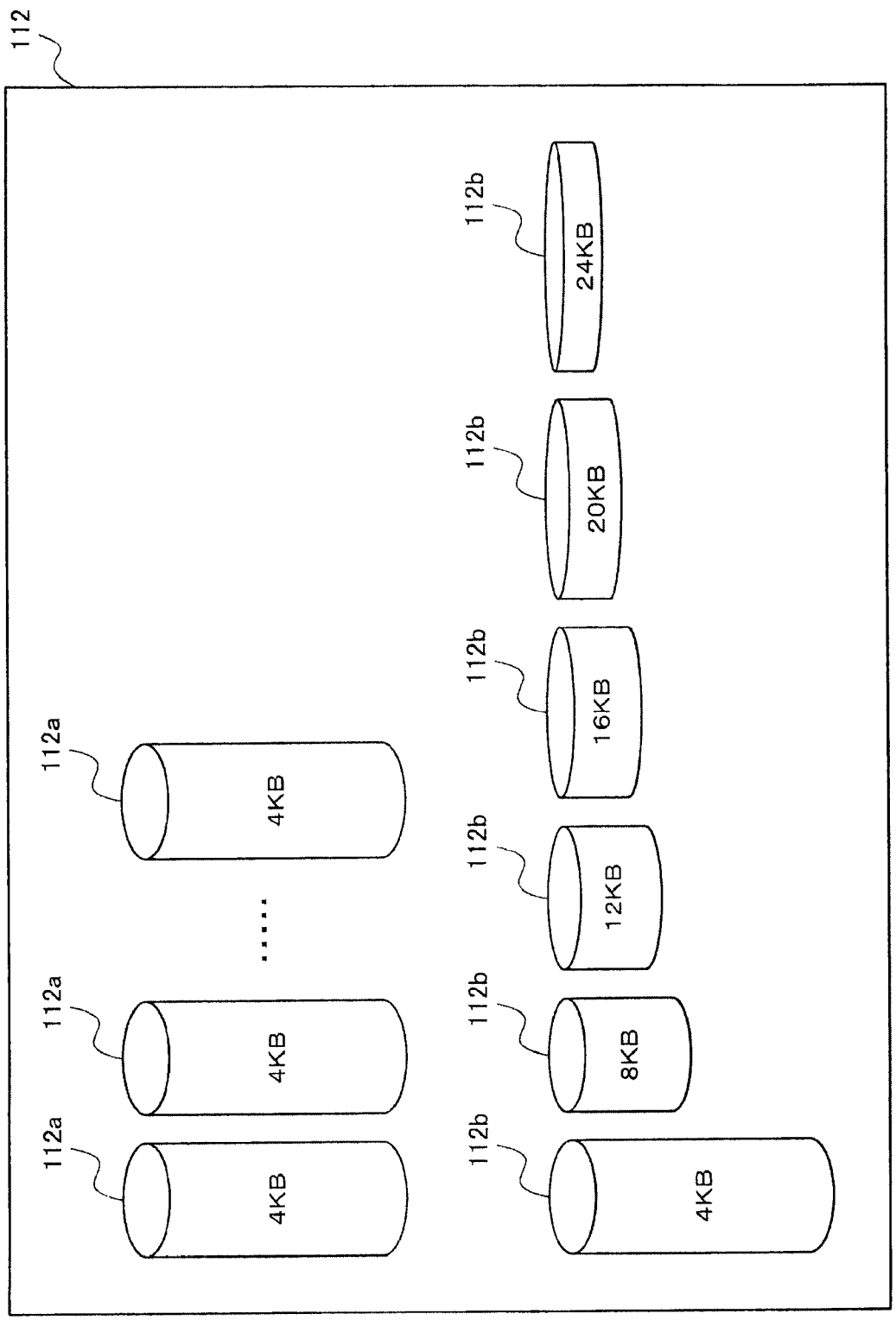

PRIORITY PARTITION LIST 121

| PARTITION IDENTIFIER | REMAINING NUMBER COUNTER |
|---|---|
| 0003 | 9 |
| 0005 | 8 |
| 0001 | 6 |
| 0007 | 5 |
| 0004 | 2 |

KEY-VALUE DATA STORAGE SYSTEM

FOREIGN PRIORITY

This application claims priority to Japanese Patent Application No. 2013-230608 filed Nov. 6, 2013, and all the benefits accruing therefrom under 35 U.S.C. §119, the contents of which in its entirety are herein incorporated by reference.

BACKGROUND

This disclosure relates to data management technology and, more particularly, to key-value store (Key-Value Store or KVS) data management technology.

In a conventional KVS system, access key data is provided as input to a hash function and position information of a storage node storing the data is obtained from output of the hash function. When changing allocation of the range of the hash value to each storage node, a boundary of the range of the hash value to be allocated to a first node and the range of the hash value to be allocated to a second node is shifted from a first hash value to a second hash value.

SUMMARY

Embodiments include a method, system, and computer program product for managing data. A system includes a data management unit that stores and manages a set of data and a key uniquely associated with the data. An access management unit receives an access request for accessing the data associated with the key, which is made by specifying the key. The data management unit includes a first storage unit storing a set of data and a first key, which serves as a key uniquely associated with the data. The first key includes information on a storage location of the data to be accessed. A second storage unit stores a set of the first key and a second key, where the first key serves as data, and the second key serves as a key uniquely associated with the first key. The second key is specified in the access request when accessing the data associated with the first key. A relocation unit relocates the set of the data and the first key in the first storage unit in a different area of the first storage unit when a predetermined execution condition is satisfied. The first storage unit includes a first area where a size of a record for storing one of the sets of the data and the first key is a predetermined specific size. The first storage unit also includes a second area where the size of the record for storing one of the sets of the data and the first key is a size set according to the data size of the set. The relocation unit relocates the set of the data and the first key, which is a relocation target object, in the second area having the record size suitable for the data size of the set.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3A is a diagram illustrating an example of a segment hierarchy structure of the data KVS viewed from an application, and FIG. 3B is a diagram illustrating relationship between the key/data pair of a key KVS and the key/data pair of the data KVS in accordance with an embodiment.

FIG. 4 is a diagram illustrating a configuration example of a normal partition and a special partition in accordance with an embodiment.

FIG. 5A is a diagram illustrating a configuration example of the priority partition list, and FIG. 5B is a diagram illustrating a concept of a remaining number counter value registered in the priority partition list in accordance with an embodiment.

DETAILED DESCRIPTION

Figure 1:
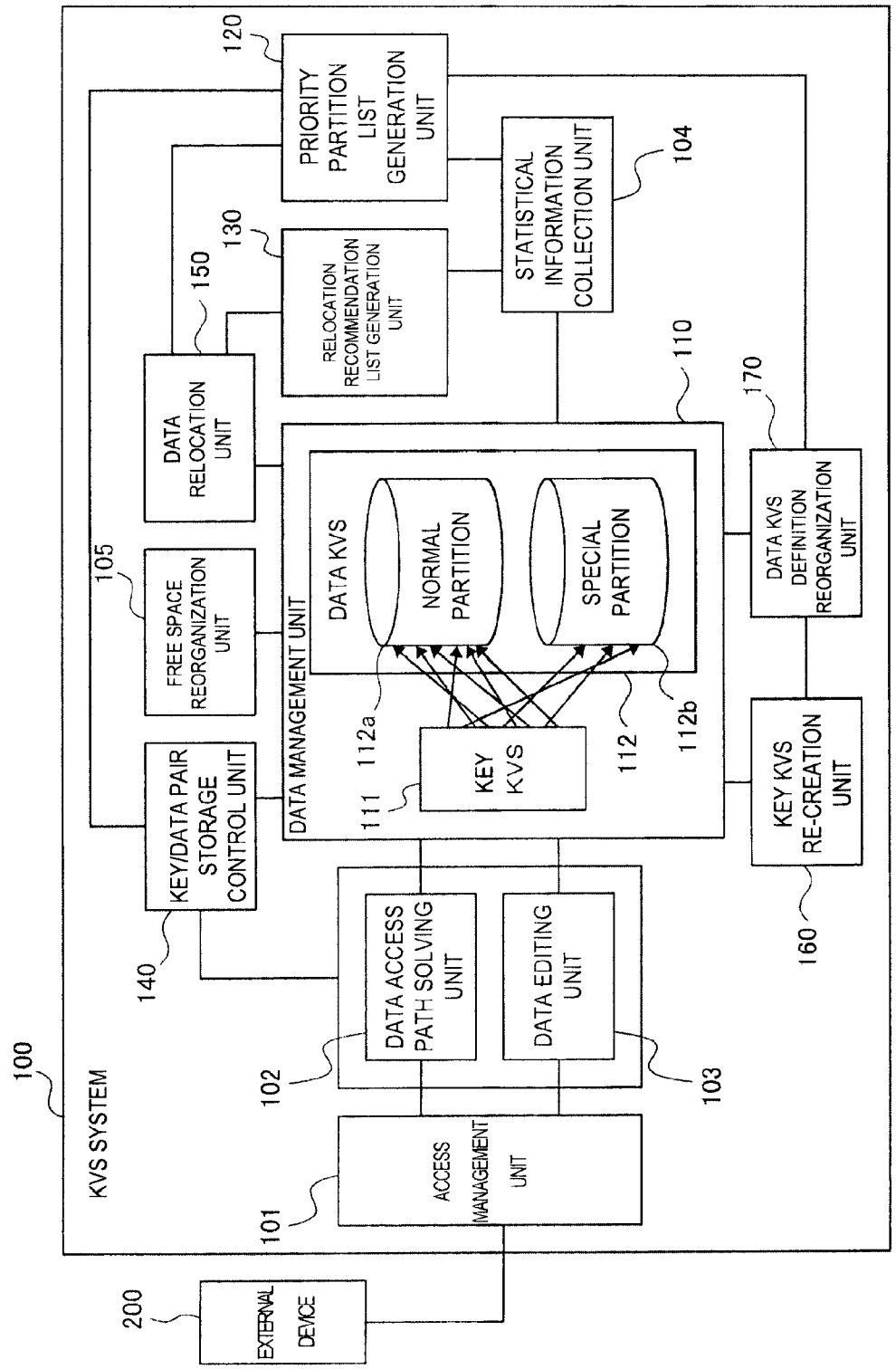
FIG. 1 is a diagram illustrating a configuration example of a KVS in accordance with an embodiment.

A key-value store (KVS) system is a data management system suitable for the use of accessing a large volume of data at a high speed. In the KVS, an arbitrary label (Key) is attached to data (Value) to be stored, and a pair of (Key, Value) is stored. Then, when acquiring the stored data, the label (Key) is specified and the corresponding data (Value) is acquired. For the KVS, addition of a server which stores the data or the like is easy, and it is also suitable for distributing and storing the data in a plurality of data servers.

In the KVS, a storage destination (a server or a partition) of a pair of a key and data is normally selected according to a predetermined fixed rule for the key value. The rule is generally distributing storage destination based on a range of the key value using a hash function or the like. In this case, a KVS system includes a hash mechanism for calculating a hash value of the key value, and the rule for selecting a storage destination is described inside the hash mechanism.

In the KVS, a storage area (partition) of a storage (insertion) destination of a pair of a key and data (hereinafter, described as a key/data pair) is normally selected according to a fixed rule for a key value using a hash function or the like. However, the number of generated keys for each key group and the size and growth of data for each key are not uniform. As a result, there are cases that usage of the storage area in the partition is uneven. Also, depending on the partition, as the KVS system continues its operation, generation of a high degree collision or of large data exceeding a size of a hash bucket may result in frequent occurrence of an event that the data overflows to an overflow area, which may cause degradation of a processing performance or shortage of a free space inside the partition.

As a measure for improving such situation, execution of reorganization processing of partitioning can be taken into consideration. The reorganization processing of the partitioning often requires change of a storage destination partition based on a key value and change of generation logic of the hash value. Then, in such change of the storage destination partition based on the key value and change of the generation logic of the hash value, it is needed to change a rule inside the hash mechanism provided in the KVS system. The work is carried out generally through a procedure of stopping a partition group to be affected for a fixed period, unloading all the data at once and then reloading it. Since such large-scaled work is accompanied, the reorganization processing of the partitioning is often carried out periodically at a fixed interval of time.

However, a case where the usage of the KVS greatly varies in a short period of time, such as sudden increase of a transaction amount for each account, cannot be sufficiently coped with by the periodical batch reorganization processing as described above. In order to cope with such a case, a new technology of preferentially improving symptoms from the severe symptoms such as the degradation of the performance and free space shortage is demanded.

Embodiments of invention to achieve a system capable of reorganizing a storage destination individually for each access target object, on the basis of its actual usage, in a KVS. The system for managing data includes a data management unit for storing and managing a set of data and a key uniquely associated with the data; and an access management unit for receiving an access request for accessing the data associated with the key, the access request being made by specifying the key. The data management unit includes a first storage unit storing a set of data and a first key, the first key serving as a key uniquely associated with the data, the first key including information on a storage location of the data to be accessed; a second storage unit storing a set of the first key and a second key, the first key serving as data, the second key serving as a key uniquely associated with the first key, the second key being specified in the access request when accessing the data associated with the first key; and a relocation unit for relocating the set of the data and the first key in the first storage unit in a different area of the first storage unit, when a predetermined execution condition is satisfied. The first storage unit includes a first area where a size of a record for storing one of the sets of the data and the first key is a predetermined specific size; and a second area where the size of the record for storing one of the sets of the data and the first key is a size set according to the data size of the set. The relocation unit relocates the set of the data and the first key, which is a relocation target object, in the second area having the record size suitable for the data size of the set.

An embodiments of the present invention is realized in a system for managing data. A data management unit for storing and managing a set of data and a key uniquely associated with the data; and an access management unit for receiving an access request for accessing the data associated with the key, the access request being made by specifying the key. The data management unit includes a first storage unit storing a set of data and a first key, the first key serving as a key uniquely associated with the data, the first key including information on a storage location of the data to be accessed; a second storage unit storing a set of the first key and a second key, the first key serving as data, the second key serving as a key uniquely associated with the first key, the second key being specified in the access request when accessing the data associated with the first key; and a relocation unit for relocating the set of the data and the first key in the first storage unit in a different area of the first storage unit, when a predetermined execution condition is satisfied. The first storage unit includes a first area where a size of a record for storing one of the sets of the data and the first key is a predetermined specific size; and a second area where the size of the record for storing one of the sets of the data and the first key is a size set according to the data size of the set. The relocation unit relocates the set of the data and the first key, which is a relocation target object, in the second area having the record size suitable for the data size of the set.

Also, in more detail, when, as the execution condition, the data size of a set among the sets of the data and the key stored in the first area or the second area of the first storage unit is larger than a threshold determined for the first area or the second area in which the set is stored, the relocation unit relocates the set in the other second area. Or, when, as the execution condition, degree of collisions of the hash value identifying the storage location of the set of the data and the key in the first area of the first storage unit is greater than a predetermined threshold, the relocation unit relocates the set in the second area.

Also, the system may further include a storage control unit for acquiring the data and the second key that are new on the basis of the access request, specifying the storage location of the data in the first area of the first storage unit, generating the first key including the information on the storage location, storing the set of the first key and the data at the specified storage location, creating the set of the acquired second key and the created first key, and storing the set in the second storage unit. Further, in the system, when the set of the data and the first key is relocated, the relocation unit may update the first key by replacing the information on the storage location of the set included in the first key with the information on the storage location after relocation, and replace the first key in the set of the second key and the first key associated with the relocated data, which is stored in the second storage unit, with contents updated on the basis of the storage location after the relocation.

Another embodiment may be realized as a method for managing data implemented by a computer in a system that includes a data management unit for storing and managing a set of data and a key uniquely associated with the data and an access management unit for receiving an access request for accessing the data associated with the key, the access request being made by specifying the key, the data management unit including a first storage unit storing a set of data and a first key, the first key serving as a key uniquely associated with the data, the first key including information on a storage location of the data to be accessed, a second storage unit storing a set of the first key and a second key, the first key serving as data, the second key serving as a key uniquely associated with the first key, the second key being specified in the access request when accessing the data associated with the first key, and a relocation unit for relocating the set of the data and the first key in the first storage unit in a different area of the first storage unit when a predetermined execution condition is satisfied, the first storage unit including a first area where a size of a record for storing one of the sets of the data and the first key is a predetermined specific size, and a second area where the size of the record for storing one of the sets of the data and the first key is a size set according to the data size of the set, the method includes determining, as the execution condition of relocation, whether or not the data size of the set among the sets of the data and the key stored in the first area or the second area of the first storage unit is larger than a threshold determined for the first area or the second area in which the set is stored, determining, as the execution condition of the relocation, whether or not degree of collisions of a hash value indicating the storage location of the set of the data and the key in the first area of the first storage unit is greater than a predetermined threshold, and relocating a set of the data and the key in the second area by the relocation unit when the set satisfies either of the execution conditions.

Further, the present invention may be realized as a computer program product for achieving respective functions of the above-described device by controlling a computer, or a program for making the computer execute processing corresponding to the respective procedures described above as well. The program can be provided by being stored and distributed in a recording medium such as a magnetic disk, an optical disk, a semiconductor memory or the like, or being distributed through a network.

Technical effects and benefits of the embodiments include a KVS with the ability to reorganize the storage destination individually for each access target object on the basis of its actual usage. A specific embodiment is described below with reference to attached drawings.

FIG. 1 is a diagram illustrating a configuration example of a KVS system to which the present embodiment is applied. A KVS system 100 to which the present embodiment is applied includes a data management unit 110, a priority partition list generation unit 120, and a relocation recommendation key list generation unit 130. Also, the KVS system 100 of the present embodiment includes a key/data pair storage control unit 140, a data relocation unit 150, a key KVS re-creation unit 160, and a data KVS definition reorganization unit 170. Also, the KVS system 100 of the present embodiment includes an access management unit 101, a data access path solving unit 102 and a data editing unit 103 as an interface, a statistical information collecting unit 104 for handling statistical information of the data management unit 110, and a free space reorganization unit 105.

As illustrated in FIG. 1, the access management unit 101 of the KVS system 100 of the present embodiment receives access by application software (hereinafter, called an application) on an external device 200, and carries out various kinds of processing. The access management unit 101 is realized by an API (Application Programming Interface) for instance. The application on the external device 200 requests the access by a key (a key value in a key/data pair) associated with data to the KVS system 100 to execute the processing such as execution of storing (inserting) data and searching for desired data to read, update and delete the data.

The data management unit 110 includes data storage by the KVS. In the present embodiment, the KVS as a first storage unit for managing data (application data) as an access target object for the application accessing the KVS system 100 and the KVS as a second storage unit for managing the key value (application key) recognized by the application are individually provided. Hereinafter, the KVS (second storage unit) for managing the application key is defined as a key KVS 111, and the KVS (first storage unit) for managing the application data is defined as a data KVS 112.

The KVS stores the key/data pair in a record that is a managed object. In the present embodiment, for the key/data pair stored in the key KVS 111, a key part is the application key, and a data part is a value including a key value for the data KVS 112. Also, for the key/data pair stored in the data KVS 112, the key part is a fixed-length value that is set on the basis of a predetermined rule and that is unique for each key/data pair, and the data part is the application data. That is, the data management unit 110 of the present embodiment manages the application key and the application data in association by the KVSs of a dual structure that are the key KVS 111 and the data KVS 112. Also, the data part in the key/data pair of the data KVS 112 includes the value of the application key. The application key value is used when, for instance, the key/data pair of the key KVS 111 is updated or the key KVS is re-created.

In the key KVS 111, for a selection rule for selecting the storage destination of the key/data pair, an appropriate hash function selected, for instance, according to attributes and distribution of the application key is used. In the meantime, in the data KVS 112, for the selection rule for selecting the storage destination of the key/data pair, a special selection rule using an appropriate hash function is prepared. Details of the selection rule in the data KVS 112 will be described later. The selection rules are described in a hash mechanism not shown in the diagram.

Figure 2:
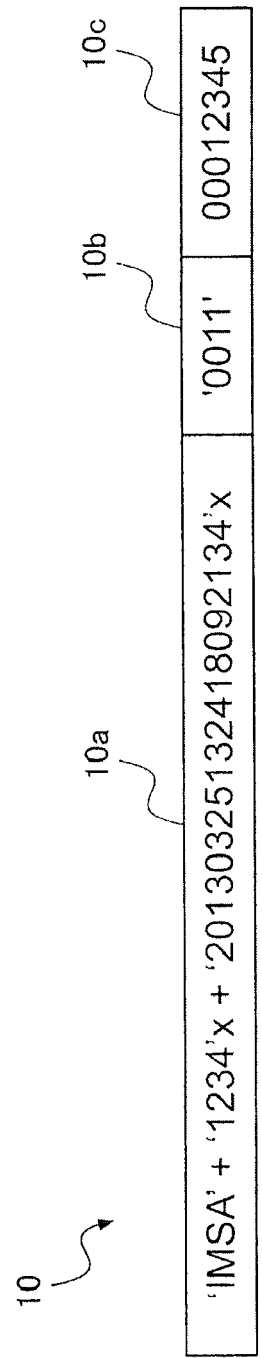
FIG. 2 is a diagram illustrating a configuration example of a key part in a key/data pair of a data KVS in accordance with an embodiment.

The key part in the key/data pair in the data KVS 112 will be described further. FIG. 2 is a diagram illustrating a configuration example of the key part in the key/data pair in the data KVS 112. The value of the key part 10 illustrated in FIG. 2 is constituted of three partial values 10a, 10b and 10c.

The partial value 10a is a specific value individually assigned to each application data recorded in the data part corresponding to the key part 10. The partial value 10a may be a value set in any way as long as it is a unique value in the entire data KVS 112. For instance, it may be a value or the like that guarantees uniqueness by adding a value of identification information of the application container to a value of a UTC time stamp upon locating (insertion) or upon relocation. Also, when search efficiency by using hash values is good, the application key value may be used as it is as the partial value 10a. In the example illustrated in FIG. 2, a value which is a combination of the server instance ID ('IMSA'), the identification information ('1234'x) of the application container, and the UTC time stamp ('20130325132418092134'x) is presented as the partial value 10a.

The partial value 10b is a value of the identification information of a partition (hereinafter, a belonging partition) in which the key/data pair is stored. The partial value 10c is the hash value of the application key in the belonging partition. When the partial value 10c is a non-negative value, the data KVS 112 determines, by the partial value 10b and the partial value 10c, the belonging partition and a hash bucket inside the partition as the storage destination of the key/data pair. On the other hand, when the partial value 10c is a negative value, the data KVS 112 calculates the hash value of the combined value of the partial values 10a and 10b, replaces the partial value 10c with the calculated hash value, and determines the hash bucket inside the belonging partition.

Back to FIG. 1, the data management unit 110 of the present embodiment includes a normal partition 112a as a first area to be initially used, and a special partition 112b as a second area to be used as a relocation destination of a special key/data pair, as the partitions managed by the data KVS 112. To the normal partition 112a, the key/data pair is stored on the basis of a data storage (insertion) instruction by the application on the external device 200. To the special partition 112b, by control of the data relocation unit 150, the key/data pair is stored in the form of being moved from the normal partition 112a. Details of the normal partition 112a and the special partition 112b will be described later. In the descriptions below, when it is not needed to specially distinguish the normal partition 112a and the special partition 112b, they will be described as the partitions 112a and 112b.

When a search request of the application data from the external device 200 is received by the access management unit 101, the KVS system 100 of the present embodiment determines (solves) an access path to the application data by the data access path solving unit 102, and executes search processing. The access path is determined by the data access path solving unit 102 on the basis of a database definition (DBD) defining a database (data store) structure of the data management unit 110. Functions of the data access path solving unit 102 are similar to access path determination in a conventional KVS system except for using the database definition based on the database structure of the data management unit 110 in the present embodiment.

Also, when a search result based on the search request of the application data from the external device 200 is obtained, the KVS system 100 edits data of the search result to be returned to the external device 200 by the data editing unit 103, and returns it to the external device 200 by the access management unit 101. The data of the search result is edited on the basis of a view definition (PSB) determined for the application on the external device 200. Functions of the data editing unit 103 are similar to editing for the data of the search result in the conventional KVS system.

The statistical information collecting unit 104 periodically collects statistical information for free spaces of the partitions 112a and 112b of the data KVS 112. As the statistical information, similarly to the statistical information collected in a conventional KVS system, for instance, information on a usage of an overflow area, a condition of free spaces, influence thereof on I/O performance, degrees (synonym lengths) of hash collisions and a distribution thereof, or the like information is collected.

The free space reorganization unit 105 reorganizes the free spaces inside the individual partitions 112 in the data KVS 112 when the application data is relocated or the like timing. Functions of the free space reorganization unit 105 are similar to techniques for reorganizing free spaces of a storage device accompanying the relocation of the data or the like operation in the conventional KVS system.

Also, in the KVS system 100 of the present embodiment, the priority partition list generation unit 120 generates a priority partition list on the basis of the statistical information collected by the statistical information collecting unit 104. Also, when the statistical information collected by the statistical information collecting unit 104 is updated accompanying the operation of the KVS system 100, the priority partition list generation unit 120 updates the priority partition list on the basis of the updated statistical information. The priority partition list is a list of the partitions each of which is to be preferentially selected as a storage destination of the application data when the application data (key/data pair) is to be newly stored. One priority partition list is generated for the data KVS 112. Details of the priority partition list will be described later.

The relocation recommendation key list generation unit 130 generates a relocation recommendation key list on the basis of the statistical information collected by the statistical information collecting unit 104. Also, when the statistical information collected by the statistical information collecting unit 104 is updated accompanying the operation of the KVS system 100, the relocation recommendation key list generation unit 130 updates the relocation recommendation key list on the basis of the updated statistical information. The relocation recommendation key list is a list of key values with an extremely large data amount and key values having the hash value with many collisions. Also, one relocation recommendation key list each is generated for each of all the partitions of the data KVS 112 including the special partition 112b. Details of the relocation recommendation key list will be described later.

When the application data (key/data pair) is to be newly stored, the key/data pair storage control unit 140 refers to the priority partition list, and preferentially stores the application data in the normal partition 112a with more free hash buckets. Thus, it is possible to reduce occurrence of an imbalance of the data amount between the normal partitions 112a in the data KVS 112 accompanying new storage of the application data.

The data relocation unit 150 relocates the application data that is inside the individual partitions 112a and 112b of the data KVS 112 and that is identified by the relocation recommendation key list into an appropriate special partition 112b according to characteristics of the data. The relocation of the application data is executed selectively on demand in concert with updating of the relocation recommendation key list. Thus, the hash collisions and data overflow to an overflow area of the data KVS 112 can be dissolved or mitigated.

The key KVS re-creation unit 160 extracts the application key value included in the data part (application data) from the key/data pair inside the partitions 112a and 112b of the data KVS 112. Then, the key KVS re-creation unit 160 re-creates the key/data pair of the key KVS 111 using the value of the key part (hereinafter, called a data KVS key) of the above-stated key/data pair in the data KVS 112 from which the above-stated application key is extracted and the extracted application key value.

The data KVS definition reorganization unit 170 reorganizes the data KVS 112 by reloading the key/data pair unloaded from the partitions 112a and 112b of the data KVS 112 to the partitions 112a and 112b allocated according to a new database definition. Then, after the key/data pairs are reloaded to the data KVS 112, the key/data pairs of the key KVS 111 are re-created by the key KVS re-creation unit 160, on the basis of contents of the partitions 112a and 112b of the reorganized data KVS 112.

<Structure of Key KVS>

Next, a structure of the key KVS 111 in the data management unit 110 of the present embodiment will be described. The key KVS 111 of the present embodiment includes only fixed length root segments. The fixed length root segment has a field for keeping the application key. The field corresponds to a sequence key (primary key) field of the key KVS 111, and is also comparable to a sequence key field as a secondary index (to the data KVS 112) in the data management unit 110. Also, the fixed length root segment has a field that keeps the key value of the data KVS 112 corresponding to the application key value. The field corresponds to the data part in the key/data pair of the key KVS 111, and is also comparable to an index pointer field as the secondary index in the data management unit 110.

In the present embodiment, the KVS of a hash table type is used as the key KVS 111 so as to update the data part of the key/data pair of the key KVS by direct access at a high speed. As the hash mechanism of the key KVS 111, a hash routine used in a conventional database or the like is usable. However, when the application key can be grouped, from the viewpoint of maintenance/operations, division into partitions for each group may be carried out and key hash may be carried out after selecting a partition by group identification information in the key value (two-stage hashing). Also, from the viewpoint of efficiency of search specifying a key range and of key order access, a special hash routine that clusters physical storage locations of root segments in key value sequence in each of the groups may be used.

<Structure of Data KVS>

Figure 3A:
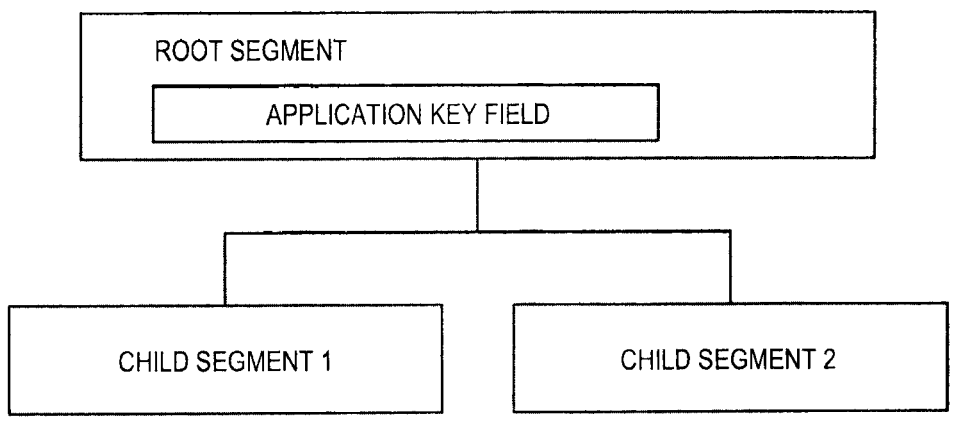
FIGS. 3A and 3B are diagrams illustrating a structure of the data KVS.
Figure 3B:
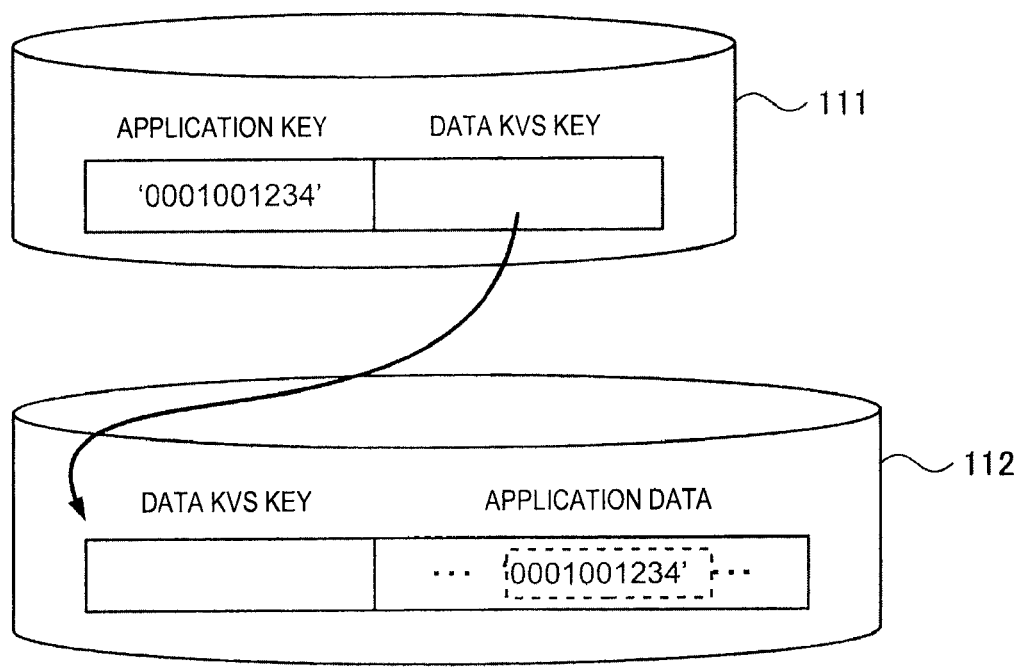

Next, a structure of the data KVS 112 in the data management unit 110 of the present embodiment will be described. FIG. 3 is a diagram illustrating the structure of the data KVS 112. FIG. 3(*a*) illustrates an example of a segment hierarchy structure of the data KVS 112 viewed from the application, and FIG. 3(*b*) illustrates relationship between the key/data pair of the key KVS 111 and the key/data pair of the data KVS 112. As illustrated in FIG. 3(*b*), the key KVS 111 is comparable to the secondary index to the data KVS 112.

In the data KVS 112 of the present embodiment, a plurality of partitions is configured. The segment hierarchy structure (tree structure) viewed from the applications, a so-called database record, which is illustrated in the example in FIG. 3(*a*), corresponds to the data part in the key/data pair of the data KVS 112. However, the application key in the root segment is defined as a normal field (application key field). Also, the sequence key field defined on the basis of the structure of the data KVS key that is above-described with reference to FIG. 2 is defined at the head of the root segment, and the above-defined sequence key field is turned to the sequence key field in the data KVS 112. Then, the application key field is turned to a search field for the key KVS 111 viewed as the secondary index as illustrated in FIG. 3(*b*), and the root segment of the data KVS 112 is turned to a target segment.

In the hash mechanism of the data KVS 112, for the hash routine, for instance, a normal randomizing routine used in the hash mechanism of a conventional database can be utilized.

<Partition Structure of Data KVS>

Next, a structure of the partitions 112*a* and 112*b* of the data KVS 112 will be described in detail. As described above, the data KVS 112 provided in the data management unit 110 of the KVS system 100 of the present embodiment has two kinds of partitions that are the normal partition 112*a* and the special partition 112*b*. The individual partitions 112*a* and 112*b* are appropriately added as the key/data pairs to be stored increase.

In the normal partition 112*a*, a size of the record in which key/data pairs are stored is configured to be a size (VSAM CI size) of the hash bucket having a predetermined fixed length. The hash bucket size is determined on the basis of an average application data length (database record length) in the data KVS 112. For instance, a proper application data length is initially set, and reset can be executed on the basis of the statistical information collected by the statistical information collecting unit 104 when the KVS system 100 is actually operated and reorganization of partitioning for data KVS 112 or the like is performed.

In the special partition 112*b*, the size of the record in which the key/data pairs are stored is individually configured for each individual special partition 112*b* so that the size is determined according to the actual application data length. Also, when the application data larger than the hash bucket size of the already provided normal partition 112*a* or special partition 112*b* is generated, a special partition 112*b* of the hash bucket size capable of storing the key/data pair of the application data is newly provided.

FIG. 4 is a diagram illustrating a configuration example of the normal partition 112*a* and the special partition 112*b* in the present embodiment. The individual partitions 112*a* and 112*b* each have the hash buckets of a size set as described later, and also have an overflow area for tentatively receiving large data exceeding the size of the hash bucket. The number of the hash buckets and the size of the overflow area of the individual partitions 112*a* and 112*b* are adjusted according to the data amount. For instance, a proper number of the hash buckets and a proper size of the overflow area are initially set, and reset can be executed on the basis of the statistical information collected by the statistical information collecting unit 104 when the KVS system 100 is actually operated and reorganization of partitioning or the like is performed.

In the example illustrated in FIG. 4, the plurality of normal partitions 112*a* is provided. And, the hash bucket size of each normal partition 112*a* is set at 4 KB as an example.

Also, in the example illustrated in FIG. 4, for the special partitions 112*b*, the one of the hash bucket sizes being 4 KB, the one of the hash bucket sizes being 8 KB, the one of the hash bucket sizes being 12 KB, the one of the hash bucket sizes being 16 KB, the one of the hash bucket sizes being 20 KB, and the one of the hash bucket sizes being 24 KB, are set respectively. For instance, the special partition 112*b* of the hash bucket size being 4 KB is used for storing the application data having the application data length of 3.2 KB or less in consideration of the length of the data KVS key. Also, the special partition 112*b* of the hash bucket size being 8 KB is used for storing the application data which is larger than 3.2 KB and is equal to or smaller than 6.4 KB. The special partition 112*b* of the hash bucket size being 12 KB is used for storing the application data which is larger than 6.4 KB and is equal to or smaller than 9.6 KB. The special partition 112*b* of the hash bucket size being 16 KB is used for storing the application data which is larger than 9.6 KB and is equal to or smaller than 12.8 KB. Also, the special partition 112*b* of the hash bucket size being 20 KB is used for storing the application data which is larger than 12.8 KB and is equal to or smaller than 16 KB. The special partition 112*b* of the hash bucket size being 24 KB is used for storing the application data which is larger than 16 KB.

As illustrated in FIG. 4, the special partitions 112*b* may be configured to have one of the hash bucket sizes larger than the size for the normal partition 112*a* and also may be configured to have the same hash bucket size (4 KB in the example illustrated in the diagram) as the size for the normal partition 112*a*. Also, while one special partition 112*b* is described for each hash bucket size in FIG. 4, a plurality of special partitions 112*b* may be provided for each hash bucket size according to the amount of the corresponding application data. Also, though not specially illustrated in the diagram, when the application data (for instance, the application data larger than 19.2 KB) which cannot be stored in the special partition 112b of the hash bucket size being 24 KB is generated, the special partition 112b of a larger hash bucket size can be newly added so as to store the application data.

<Storage and Relocation of Application Data>

In the present embodiment, when the application data (key/data pair) is stored in the data management unit 110 of the KVS system 100, a new key/data pair is located in the normal partition 112a first. Then, when the degree of the hash collisions increases and need occurs to relocate the application data or when need occurs to store the application data exceeding the hash bucket size of the normal partition 112a or the like conditions, the key/data pairs of the application data are relocated in the special partition 112b.

The storage destination when locating the key/data pair in the normal partition 112a is determined on the basis of the priority partition list generated by the priority partition list generation unit 120. Also, the key/data pair that needs to be relocated to the special partition 112b is determined on the basis of the relocation recommendation key list generated by the relocation recommendation key list generation unit 130. The storage destination when relocating the key/data pair to the special partition 112b is determined according to the size of the key/data pair to be relocated or the like.

<Generation of Priority Partition List>

Here, generation processing of the priority partition list by the priority partition list generation unit 120 will be described. The priority partition list generation unit 120 first receives, from the statistical information collecting unit 104, the number of free hash buckets and a threshold determined for an average value of degrees of the hash collisions. Then, on the basis of the statistical information and the threshold, the priority partition list relating to the normal partition 112a, of the data KVS 112, that exceeds the threshold is created. The threshold may be set automatically according to a predetermined rule or may be set by receiving input by a user.

Figures 5A, 5B:
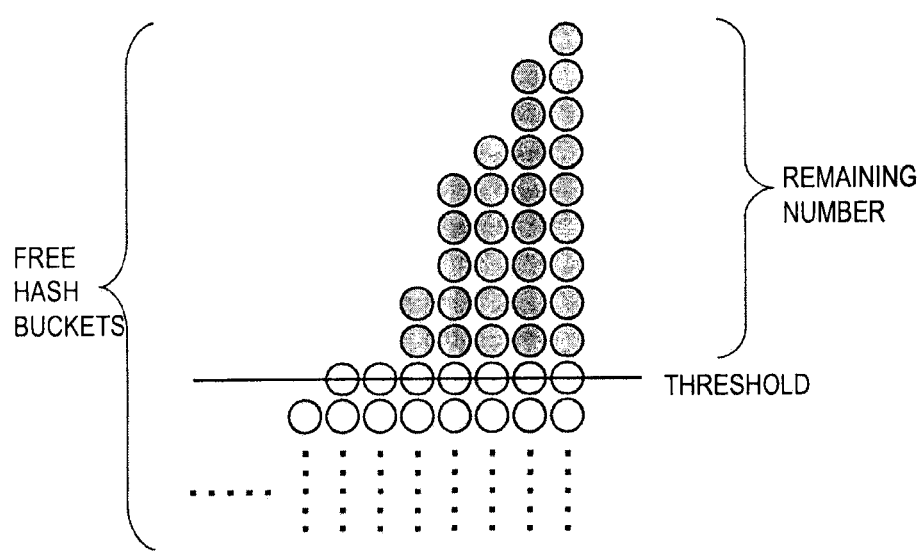
FIGS. 5A and 5B are diagrams illustrating a priority partition list.

FIG. 5 is a diagram illustrating the priority partition list, FIG. 5(a) is a diagram illustrating a configuration example of the priority partition list, and FIG. 5(b) is a diagram illustrating a concept of a remaining number counter value registered in the priority partition list. In the example illustrated in FIG. 5(a), individual entries of a priority partition list 121 each have two fields of "partition identifier" and "remaining number counter", and are sorted in a descending order of the value of the "remaining number counter". The configuration of the priority partition list 121 illustrated in FIG. 5(a) is just an example, and the priority partition list 121 may be configured including information (for instance, the maximum value, minimum value and average value of the number of the collisions or the like information) other than the information illustrated in the diagram. Also, the order of the fields in the individual entries may be arbitrary.

As illustrated in FIG. 5(b), the remaining number counter is a value for which the threshold determined for the number of free hash buckets is subtracted from the number of free hash buckets of the respective partitions corresponding to the respective entries. In the example illustrated in FIG. 5(b), there are the partition (partition "0003" according to FIG. 5(a)) having nine free hash buckets, the partition (partition "0005" according to FIG. 5(a)) having eight free hash buckets, the partition (partition "0001" according to FIG. 5(a)) having six free hash buckets, the partition (partition "0007" according to FIG. 5(a)) having five free hash buckets, and the partition (partition "0004" according to FIG. 5(a)) having two free hash buckets. Then, it is recognized that there are the total of 30 free hash buckets.

The value of the remaining number counter is decremented by 1 every time a new key/data pair is stored in the normal partition 112a corresponding to the remaining number counter. Then, when the total sum of the remaining number counter value becomes smaller than a preset threshold (for instance, the average value of the insertion number of the new key/data pair in a fixed period or the like), the normal partitions 112a are added to the data management unit 110. Then, entries for the added normal partitions 112a are added to the priority partition list.

Figure 6:
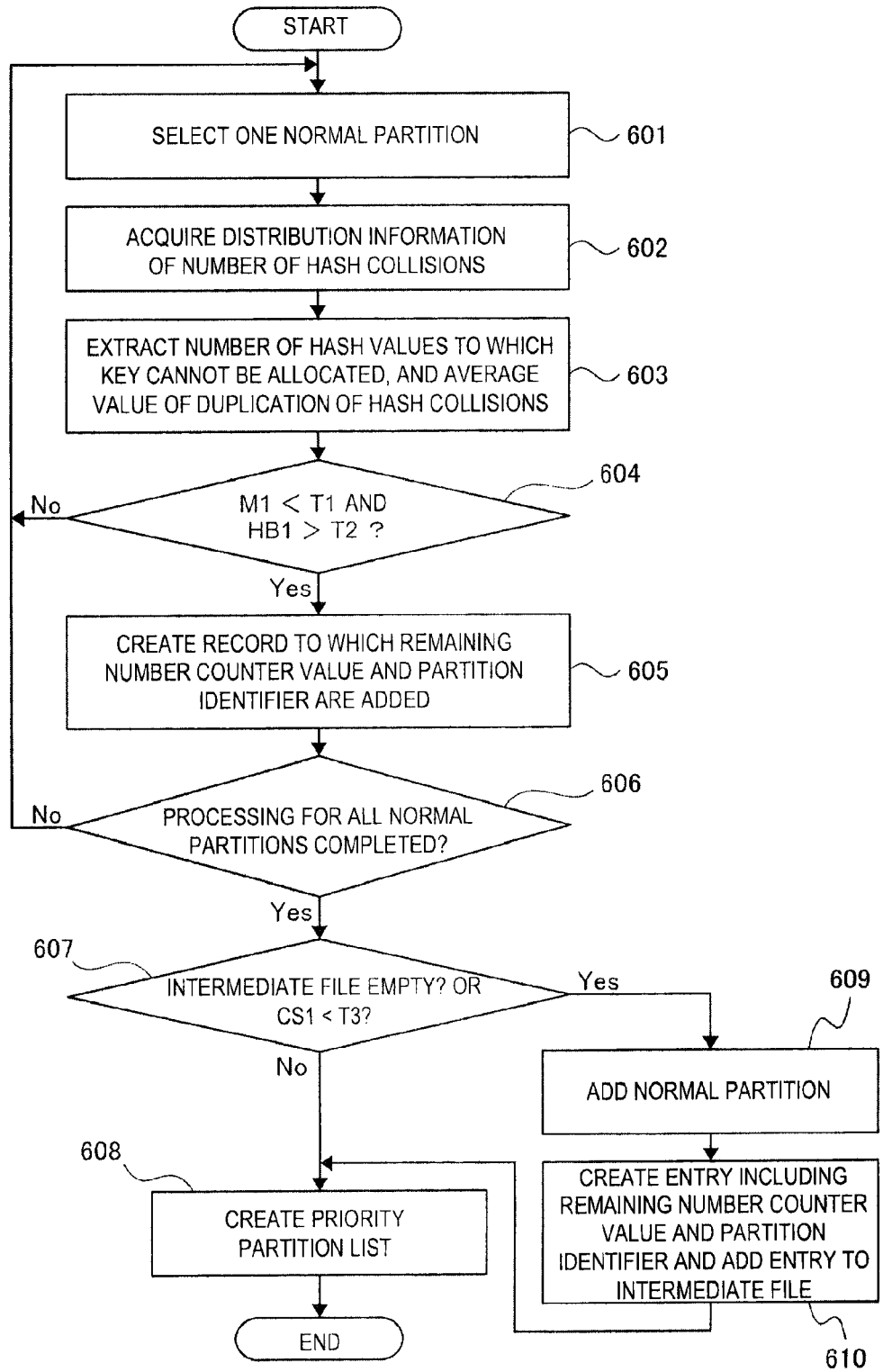
FIG. 6 is a flowchart illustrating generation processing of the priority partition list by a priority partition list generation unit in accordance with an embodiment.

FIG. 6 is a flowchart illustrating the generation processing of the priority partition list by the priority partition list generation unit 120. The generation processing of the priority partition list is carried out periodically, or when a fixed number of new key/data pairs is stored or at the like timing, for instance.

In the example illustrated in FIG. 6, the priority partition list generation unit 120 first selects one normal partition 112a (block 601), and acquires, from the statistical information collecting unit 104, distribution information of the number of hash collisions related to the selected normal partition 112a (block 602). Then, the priority partition list generation unit 120 extracts, from the acquired distribution information of the number of hash collisions, the number of hash values to which a key is not allocated at all (equivalent to the number of free hash buckets), and the average value of the degrees of the hash collisions (block 603).

Next, the priority partition list generation unit 120 determines whether or not the extracted average value (M1) of the degrees of the hash collisions is smaller than a threshold (T1) and the extracted number (HB1) of the free hash buckets exceeds a threshold (T2) (block 604). Then, when the average value (M1) of the degrees of the hash collisions is equal to or larger than the threshold (T1) or the number (HB1) of the free hash buckets is equal to or smaller than the threshold (T2), the priority partition list generation unit 120 returns to block 601, selects one unprocessed normal partition 112a, and performs similar processing.

When the extracted average value (M1) of the degrees of the hash collisions is smaller than the threshold (T1) and the extracted number (HB1) of the free hash buckets exceeds the threshold (T2), the priority partition list generation unit 120 creates a record to which a value (remaining number counter value) for which the threshold (T2) is subtracted from the extracted number (HB1) of the free hash buckets, and the partition identifier of the normal partition 112a under consideration are added, and writes it in an intermediate file (block 605). Then, the priority partition list generation unit 120 determines whether or not the processing to block 605 is performed for all the normal partitions 112a, and when unprocessed normal partitions 112a are present, returns to block 601 and repeats the processing (block 606).

After the processing to block 606 is completed for all the normal partitions 112a, the priority partition list generation unit 120 determines whether or not the intermediate file created in the processing to block 606 is empty, or whether or not the total sum (CS1) of the remaining number counter values is below a threshold (T3) (block 607). When the intermediate file is not empty and the total sum of the remaining number counter values is equal to or larger than the threshold (T3), the priority partition list generation unit 120 sorts the records recorded in the intermediate file in the descending order of the number of free hash buckets, and creates the priority partition list (block 608).

On the other hand, when the intermediate file is empty or the total sum of the remaining number counter values is smaller than the threshold (T3), the priority partition list generation unit 120 adds one new normal partition 112*a* (block 609). To the added new normal partition 112*a*, a unique partition identifier is given. Then, the priority partition list generation unit 120 creates one entry of the priority partition list including the number (remaining number counter value) for which the threshold (T2) is subtracted from the number of hash buckets of the added partition and the partition identifier of the added partition, and adds the entry to the intermediate file (block 610). Thereafter, the priority partition list generation unit 120 sorts the records recorded in the intermediate file in the descending order of the number of free hash buckets, and creates the priority partition list (block 608).

The priority partition list created as described above is stored in a memory of the key/data pair storage control unit 140, and is used to determine the storage destination when newly storing the key/data pair in the data KVS 112. The priority partition list is updated as below. First, when a new priority partition list is created in the above-described manner, the key/data pair storage control unit 140 loads the new priority partition list to the memory. Then, the key/data pair storage control unit 140 sets a current entry pointer to the priority partition list loaded to the memory, and defines the partition specified by the entry indicated by the pointer as the storage destination of the next key/data pair. By executing updating processing of the priority partition list in the key/data pair storage control unit 140 in a time period with a small transaction amount such as nighttime for instance, influence on application processing utilizing the KVS system 100 of the present embodiment can be reduced.

<Locating Processing of Key/Data Pair>

Next, locating processing of the key/data pair to the normal partition 112*a* by the key/data pair storage control unit 140 (processing of newly storing the application data in the normal partition 112*a*) will be described. When a storage request of the application data is received from the application on the external device 200, the key/data pair storage control unit 140 refers to the priority partition list stored in the memory to determine the normal partition 112*a* as the storage destination, then generates the hash value that identifies the hash bucket by the hash mechanism of the data KVS 112, and stores the key/data pair for the application data.

Figure 7:
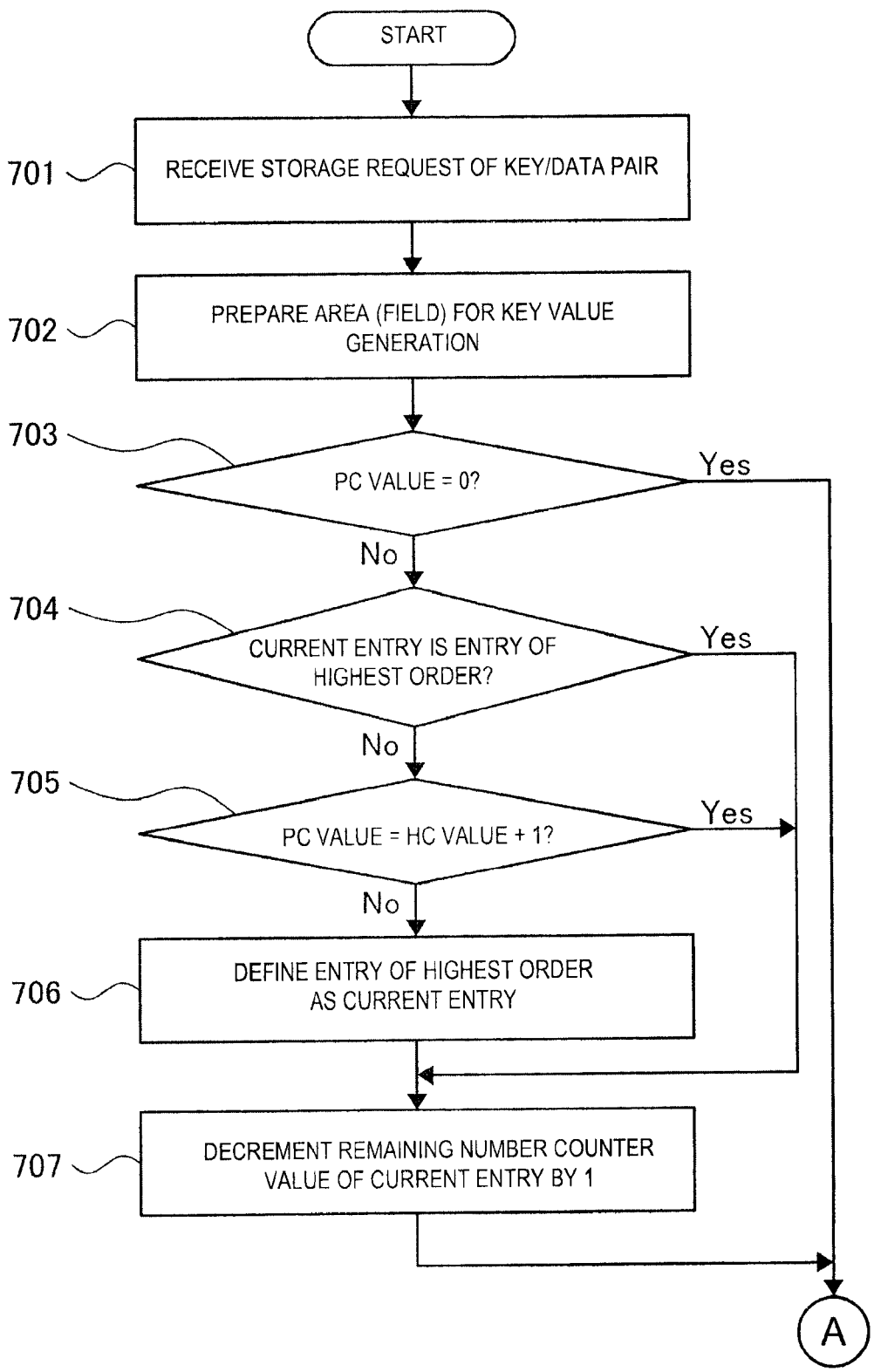
FIG. 7 is a flowchart illustrating locating processing of the key/data pair by a key/data pair storage control unit in accordance with an embodiment.
Figure 8:
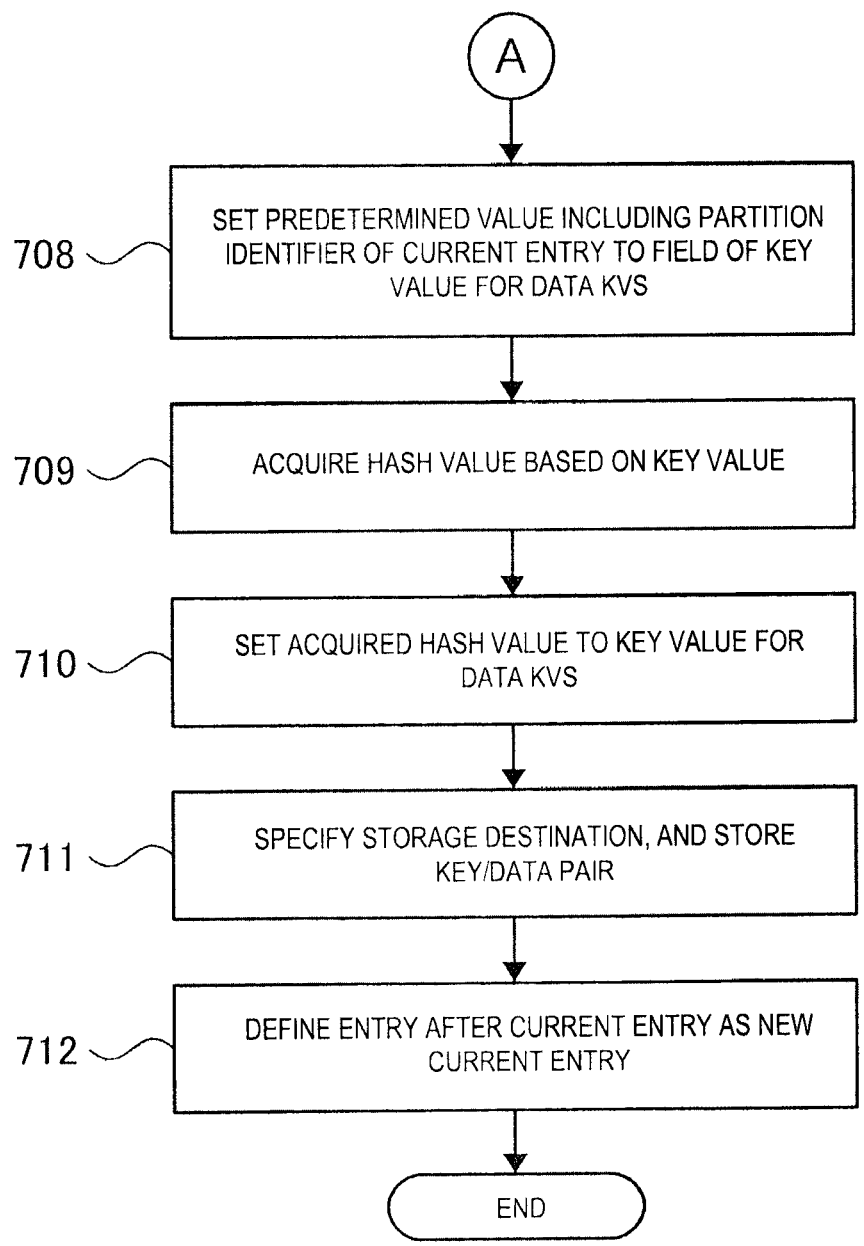
FIG. 8 is a flowchart illustrating the locating processing of the key/data pair by the key/data pair storage control unit in accordance with an embodiment.

FIG. 7 and FIG. 8 are flowcharts illustrating the locating processing of the key/data pair by the key/data pair storage control unit 140. As illustrated in FIG. 7, when the storage request of the application data (key/data pair) is received (block 701), the key/data pair storage control unit 140 prepares an area (field) to be used to generate a key value for the data KVS 112 (block 702).

Next, the key/data pair storage control unit 140 determines whether or not the remaining number counter value (PC value) of the entry (current entry), in the priority partition list, that is pointed to by the current entry pointer is zero (0) (block 703). When the remaining number counter value of the current entry is not zero, the key/data pair storage control unit 140 then determines whether or not the current entry is the entry of the highest order in the priority partition list (block 704). When the current entry is the entry of the highest order, the key/data pair storage control unit 140 decrements the remaining number counter value of the current entry by 1 (block 707).

When the current entry is not the entry of the highest order, the key/data pair storage control unit 140 determines whether or not the remaining number counter value (PC value) of the current entry is a value larger, by 1, than the remaining number counter value (HC value) of the entry of one order higher in the priority partition list (block 705). When the remaining number counter value of the current entry is the value larger by 1 than the remaining number counter value of the entry of one order higher, the key/data pair storage control unit 140 decrements the remaining number counter value of the current entry by 1 (block 707).

On the other hand, when the remaining number counter value of the current entry is not the value larger by 1 than the remaining number counter value of the entry of one order higher, the key/data pair storage control unit 140 defines the entry of the highest order in the priority partition list as the current entry (block 706), and decrements the remaining number counter value of the current entry (the entry of the highest order) by 1 (block 707).

When the remaining number counter value of the current entry is zero in block 703, or after decrementing the remaining number counter value of the current entry by 1 in block 707, as illustrated in FIG. 8, the key/data pair storage control unit 140 sets a predetermined value including the partition identifier of the current entry to the field of the key value for the data KVS 112 (block 708). Specifically, in the key part 10 for the data KVS 112 described with reference to FIG. 2, the partition identifier is set as the partial value 10*b*. Also, a unique value is set as the partial value 10*a*. The value "−1" is set as the partial value 10*c*.

Then, the key/data pair storage control unit 140 passes the key value set in block 708 to the hash mechanism of the data KVS 112 and acquires the hash value (block 709). Then, the key/data pair storage control unit 140 sets the acquired hash value to the key value for the data KVS 112 (block 710). As described with reference to FIG. 2, when the partial value 10*c* of the key part 10 of the data KVS 112 is a negative value, the hash mechanism of the data KVS 112 calculates the hash value of the value which is the combination of the partial values 10*a* and 10*b*, and replaces the partial value 10*c* with the calculated hash value. Therefore, by setting the value "−1" to the partial value 10*c* as described above, the key/data pair storage control unit 140 calculates the hash value in block 708 and replaces the partial value 10*c* with the calculated hash value.

Next, the key/data pair storage control unit 140 specifies the normal partition 112*a* and the hash bucket as the storage destination of the key/data pair on the basis of the partition identifier and the hash value obtained in blocks 709 and 710, and stores the data KVS key and the application data (key/data pair) (block 711). When the key/data pair cannot be stored in the hash bucket specified as the storage destination (when an enough free space for storing all the application data is not present on the hash bucket or on the like condition), the key/data pair storage control unit 140 stores the key/data pair in the overflow area of the normal partition 112*a* specified by the partition identifier obtained in block 709. Also, when the key/data pair is stored in (the specified hash bucket or the overflow area of) the normal partition 112*a*, the key/data pair storage control unit 140 generates the key/data pair for which the application key value included in the application data is set as the key part value and the data KVS key is set as the data part value, and stores the pair in the key KVS 111.

Thereafter, the key/data pair storage control unit 140 makes the entry after the current entry in the above-described processing as a new current entry (the entry of the highest order as the new current entry when the current entry is the entry of the lowest order in the priority partition list), and ends the processing (block 712). Then, the key/data pair storage control unit 140 waits for a storage request for the next application data (key/data pair).

The example of the processing illustrated in the flowcharts in FIG. 7 and FIG. 8 does not guarantee that a free hash bucket is to be selected, and a present value of a remaining number counter does not always agree with the number of free partitions at the point of time. The hash value to be selected when storing the key/data pair is determined by the value of the data KVS key and the hash routine of the hash mechanism. The collision that can be caused by storing the key/data pair is resolved by the processing of the data relocation unit 150 described later.

<Generation of Relocation Recommendation Key List>

Next, generation processing of the relocation recommendation key list by the relocation recommendation key list generation unit 130 will be described. The generation processing of the relocation recommendation key list is for both of the normal partition 112a and the special partition 112b. The relocation recommendation key list generation unit 130 first receives, from the statistical information collecting unit 104, a list in which, for each database record that holds a certain amount of data or more, pieces of information on a primary key value thereof, an insertion destination partition name (area name), and the hash value (RAP number) or the like are collected and sorted in the descending order of the data amount. Also, the relocation recommendation key list generation unit 130 receives thresholds determined respectively for the database record length and the degree of the hash collisions (synonym length+1). Then, on the basis of the statistical information and the thresholds, the relocation recommendation key list relating to the data of the data KVS 112 exceeding the thresholds is created. Here, the thresholds may be automatically set according to physical characteristics of the partition such as a database block length (for instance, the threshold may be 80% of the hash bucket size or the like), or may be set by receiving input from a user.

The entries of the relocation recommendation key list each have fields to register respective values such as the value of the data KVS key, the value of the application key corresponding to the data KVS key, the data length of the application data, the hash collision degree, a recommendation reason flag, and a relocation destination partition identifier or the like, for instance. Then, sorting is carried out in the descending order of the data length of the application data. The entry of the relocation recommendation key list may be configured including information other than these. Also, the order of the fields in the respective entries may be arbitrary.

Figure 9:
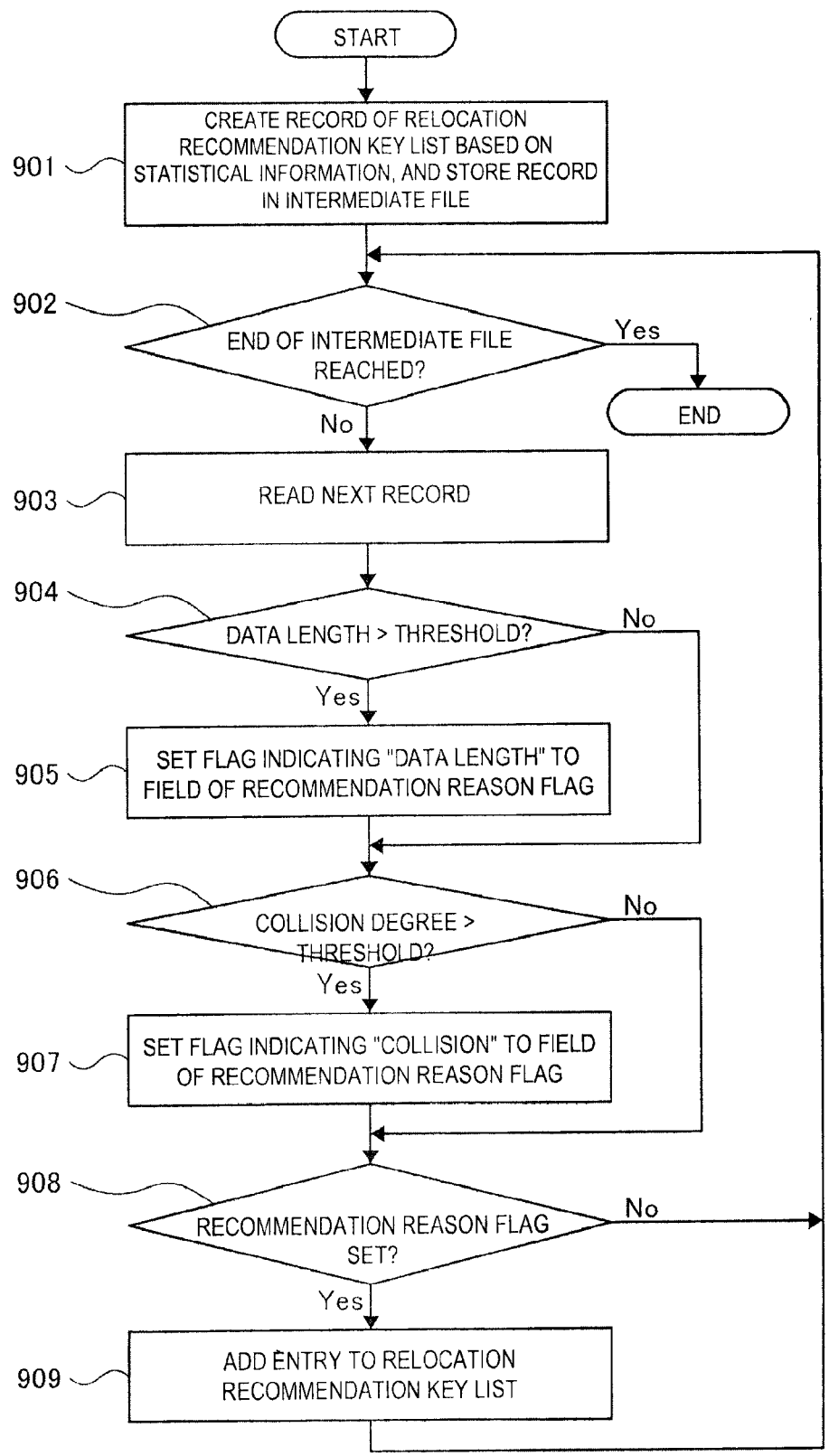
FIG. 9 is a flowchart illustrating generation processing of a relocation recommendation key list by a relocation recommendation key list generation unit.

FIG. 9 is a flowchart illustrating the generation processing of the relocation recommendation key list by the relocation recommendation key list generation unit 130. The generation processing of the relocation recommendation key list is carried out, for instance, periodically, or when the amount of the data stored in the overflow area of one of the partitions 112a and 112b becomes equal to or larger than a fixed amount or at the like timing.

In the example illustrated in FIG. 9, the relocation recommendation key list generation unit 130 first acquires the statistical information relating to the respective partitions 112a and 112b from the statistical information collecting unit 104, adds additional information, creates a record of the relocation recommendation key list, and keeps it in the intermediate file (block 901). The acquired statistical information includes the data length of the stored application data, the partition identifier, the hash value, and the key value of the key/data pair, or the like information. The additional information includes the application key corresponding to the application data, and the degree of the hash collisions, or the like information. The records created on the basis of the information are sorted with the data length as a first sorting key and the degree of the hash collisions as a second sorting key.

Next, the relocation recommendation key list generation unit 130 determines whether or not the processing has reached the end of the intermediate file (block 902). Then, when it has not reached the end, the next record is read from the intermediate file as an object to be processed (block 903). At initial startup, the first record in the intermediate file is read.

The relocation recommendation key list generation unit 130 first determines whether or not the data length registered in the read record is longer than the predetermined threshold (block 904). Then, when the data length is longer than the threshold, the relocation recommendation key list generation unit 130 sets a flag indicating "data length" in the field of the recommendation reason flag in the record (block 905).

Next, the relocation recommendation key list generation unit 130 determines whether or not the degree of the hash collisions registered in the read record is greater than the predetermined threshold (block 906). Then, when the degree of the hash collisions is greater than the threshold, the relocation recommendation key list generation unit 130 sets a flag indicating "collision" in the field of the recommendation reason flag in the record (block 907).

Then, the relocation recommendation key list generation unit 130 determines whether or not one of the above-stated flags is set in the field of the recommendation reason flag of the read record (block 908). That is, when the processing of block 905 or block 907 is performed, the flag indicating either "data length" or "collision" is set in the field of the recommendation reason flag. When the flag is set in the field of the recommendation reason flag, the pieces of registered information other than the recommendation reason flag are acquired from the record that is being processed, and the entry that holds the above-stated pieces of information and the information of the recommendation reason flag is added to the relocation recommendation key list (block 909).

When neither flag is set in the field of the recommendation reason flag in block 908, or after the entry of the relocation recommendation key list is added in block 909, the relocation recommendation key list generation unit 130 returns to block 902, and determines whether or not the processing has reached the end of the intermediate file. Then, the next record is read in block 903 when the end of the intermediate file has not been reached, and the generation processing of the relocation recommendation key list is ended when the end of the intermediate file has been reached. That is, the relocation recommendation key list generation unit 130 generates the relocation recommendation key list by reading the records in order from the head to the end of the intermediate file, and performing the processing from block 904 to block 909 for each of the read records.

Also, in the above-described operation, in all the records of the intermediate file, when either of conditions of block 904 and block 906 is not satisfied and the processing of block 905 and block 907 is not performed, the relocation recommendation key list is not created as a result. Therefore, the relocation processing of the key/data pair is not performed until the condition of block 904 or block 906 is satisfied and the relocation recommendation key list is generated in the next or in a succeeding generation processing of the relocation recommendation key list.

<Relocation Processing or Key/Data Pair>

Next, the relocation processing of the application data (key/data pair) by the data relocation unit 150 will be described. The data relocation unit 150 relocates the key/data pair for which the relocation to the special partition 112b is recommended, on the basis of the relocation recommendation key list generated in the above-described manner. The key/data pair stored in any of the normal partition 112a and the special partition 112b can be an object of the relocation. On the other hand, the partition of the relocation destination is only the special partition 112b.

Figure 10:
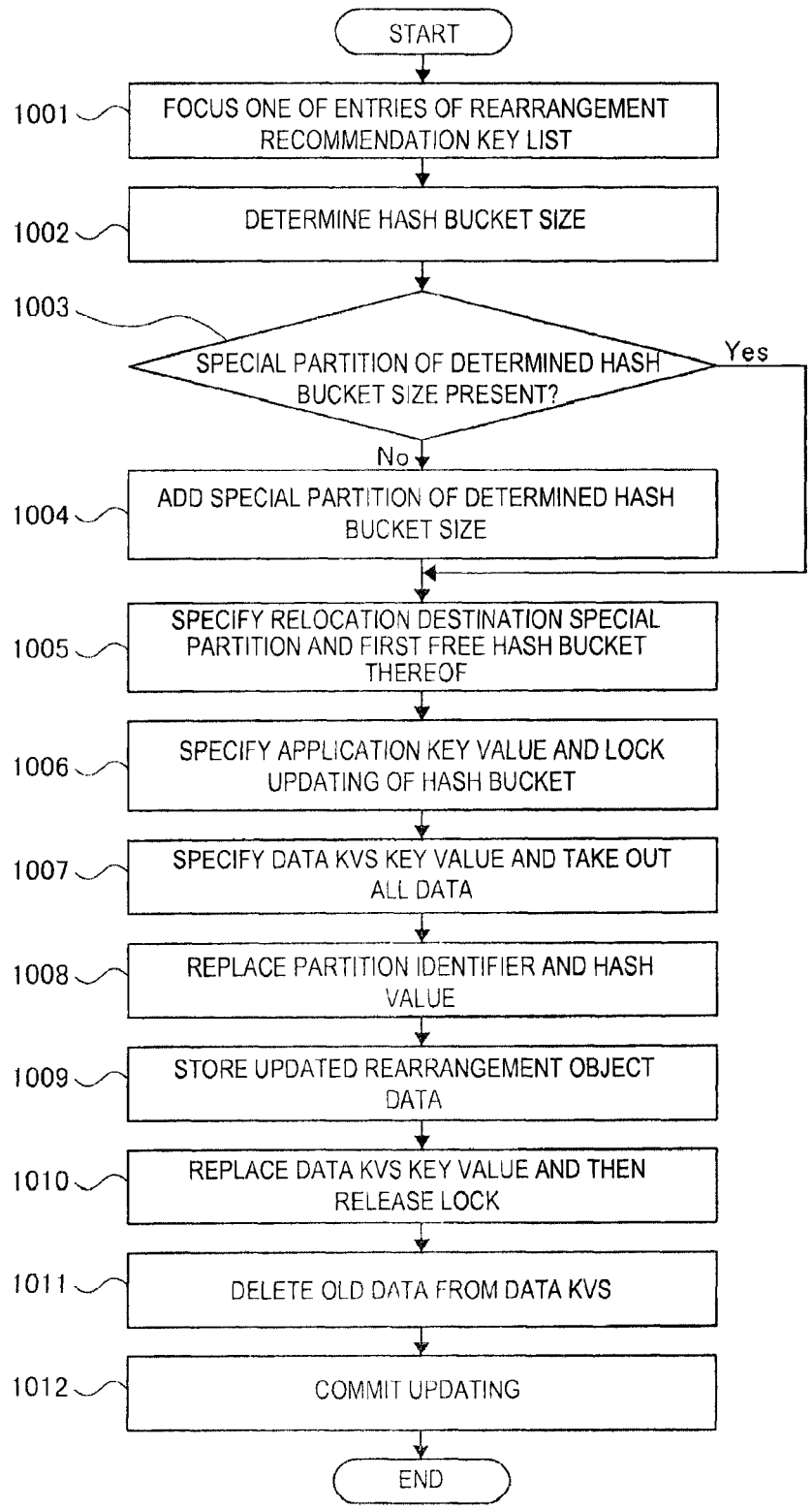
FIG. 10 is a flowchart illustrating relocation processing of the key/data pair by the data relocation unit in accordance with an embodiment.

FIG. 10 is a flowchart illustrating the relocation processing of the key/data pair by the data relocation unit 150. As illustrated in FIG. 10, the data relocation unit 150 focuses one of the entries in the relocation recommendation key list as an object of the relocation processing (block 1001). Then, the data relocation unit 150 takes out the information on the data length from the focused entry, determines the hash bucket size of the special partition 112b suited to the taken-out data length (block 1002), and determines whether or not there is a special partition 112b having the above-determined hash bucket size (block 1003). When there is no special partition 112b having the above-determined hash bucket size, a special partition 112b having the above-determined hash bucket size is added (block 1004).

Then, the data relocation unit 150 selects the special partition 112b found in block 1003 or the special partition 112b added in block 1004 as the special partition 112b of the relocation destination. Then, a space map of the selected special partition 112b is checked to identify the first free hash bucket (the area of the storage destination of the key/data pair) (block 1005). Here, the space map is a table which is provided for each special partition 112b and manages whether or not individual hash buckets are already used. The space map is referred to in each relocation processing. Also, by turning an in-use flag on for an item, of the space map, that corresponds to the hash bucket which is specified as the relocation destination and in which the key/data pair is stored, distinction between the above-stated hash bucket from an unused free hash bucket is made possible.

Next, the data relocation unit 150 specifies, for the key KVS 111, the application key value registered in the above-focused entry, and controls the key KVS 111 so that it locks the updating of the hash bucket for the above-specified application key (block 1006). Then, the data relocation unit 150 specifies, for the data KVS 112, the data KVS key value registered in the focused entry, and takes out all the data for the data KVS key value (block 1007).

The data relocation unit 150 then replaces the partition identifier and the hash value in the data KVS key value, which is described in the root segment of the relocation target object data taken out in block 1007, with the partition identifier of the special partition 112b selected in block 1005 and the hash value of the free hash bucket identified in block 1005 (block 1008).

Then, the data relocation unit 150 stores, in the data KVS 112, the relocation target object data for which the data KVS key value is updated in block 1008 in a segment hierarchy order (block 1009). In the special partition 112b identified by the new data KVS key, the relocation target object data is stored in the free hash bucket identified by the data KVS key. Then, the data relocation unit 150 replaces the data KVS key value described in the data part of the key/data pair, of the key KVS 111, that is locked in block 1006 with the new data KVS key value replaced in block 1008, and then releases the lock (block 1010).

Next, the data relocation unit 150 deletes, from the data KVS 112, old data identified by the data KVS key value before the relocation (block 1011). Then, the data relocation unit 150 commits the updating of the key KVS 111 and the data KVS 112 by the above-described processing and ends the processing (block 1012).

In the above-described manner, the relocation of the key/data pair of the entry focused as the relocation target object is completed. The relocation processing may be started from any of the partitions 112a and 112b, and any of the entries of the relocation recommendation key list for the respective partitions 112a and 112b may be processed in any order. However, when processing all the entries of the relocation recommendation key list in all the partitions 112a and 112b, the processing is performed in the descending order of the CI sizes (hash bucket sizes) for the special partitions 112b, and after the processing for the special partitions 112b is all ended, the processing for the normal partitions 112a is performed. The relocation recommendation key of the special partition 112b having the longest CI size can be coped with by expanding the overflow area of the special partition 112b according to the distribution of the data length without performing the relocation.

<Re-Creation Processing of Key KVS and Definition Reorganization Processing of Data KVS>

Next, re-creation processing of the key KVS 111 by the key KVS re-creation unit 160 and reorganization processing of the database definition of the data KVS 112 by the data KVS definition reorganization unit 170 will be described. When the reload processing, of the key/data pairs of the data KVS 112, that is accompanied by a definition change of the data KVS 112 is performed by the data KVS definition reorganization unit 170, the storage location, in the data KVS 112, of the application data changes. Therefore, in order to access a correct (new) storage location according to an access request from the application, it is needed to re-create the key KVS 111 accompanying the reorganization of the data KVS 112.

First, the re-creation processing of the key KVS 111 by the key KVS re-creation unit 160 will be described. The key KVS re-creation unit 160 reads the key/data pairs from all the partitions 112a and 112b relating to the key/data pairs of the key KVS 111 to be re-created among the partitions 112a and 112b of the data KVS 112, and re-creates the key/data pairs of the key KVS 111, on the basis of the information of the read key/data pairs of the data KVS 112.

Specifically, the key KVS re-creation unit 160 first extracts the value of the key included in the key part and the application key included in the data part of the read key/data pair of the data KVS 112. Then, the key KVS re-creation unit 160 writes the pair of the data KVS key and the application key extracted from the data part to the intermediate file as one record. The intermediate file is created also by the data KVS definition reorganization unit 170 when the reorganization processing of the database definition of the data KVS 112 is performed by the data KVS definition reorganization unit 170 as described later. When reading the key/data pair of the data KVS 112, in the case that the data part of the key/data pair is divided into a plurality of segments having a hierarchical structure in a structure of the data KVS 112, only the root segment may be read. Then, the key KVS re-creation unit 160 reloads the key/data pairs written to the intermediate file to the key KVS 111.

Next, the reorganization processing of the database definition of the data KVS 112 by the data KVS definition reorganization unit 170 will be described. The data KVS definition reorganization unit 170 reorganizes the data KVS 112 by reloading the key/data pairs of the data KVS 112 to the special partitions according to their data lengths. Hereinafter, processing when unloading the key/data pairs from the data KVS 112 and processing when reloading the key/data pairs to the data KVS 112 will be separately described.

Figure 11:
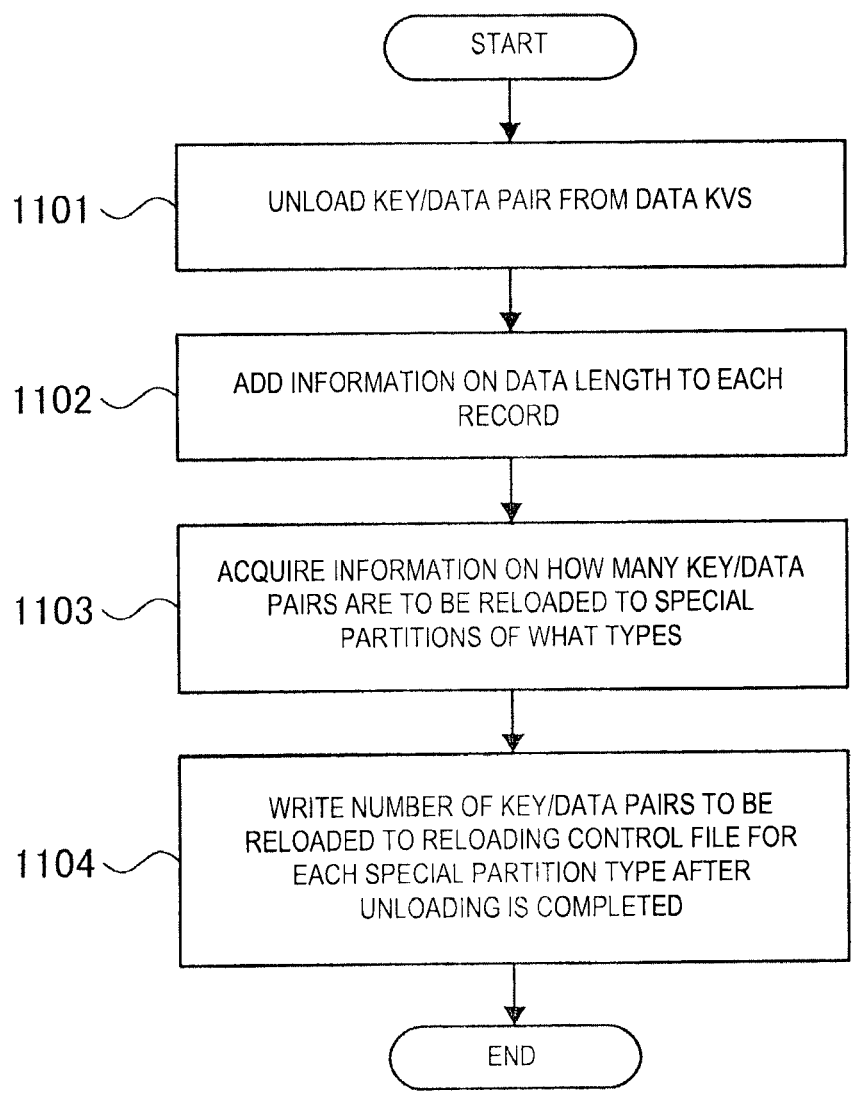
FIG. 11 is a flowchart illustrating processing when unloading the key/data pairs in reorganization processing of a database definition of a data KVS by a data KVS definition reorganization unit in accordance with an embodiment.

FIG. 11 is a flowchart illustrating the processing when unloading the key/data pairs in the reorganization processing of the database definition of the data KVS 112 by the data KVS definition reorganization unit 170. The data KVS definition reorganization unit 170 unloads the key/data pairs from the data KVS 112 (block 1101), and adds the information of the data length to each record of the key/data pairs in an unloaded file (block 1102). Also, the data KVS definition reorganization unit 170 acquires information on how many key/data pairs are to be reloaded to the special partitions 112b of what types (hash bucket sizes), on the basis of the data size of the unloaded key/data pair (block 1103). The unloaded file and the acquired information are held in an external storage for instance. Then, after unloading of the key/data pairs is completed, the data KVS definition reorganization unit 170 writes, to a reloading control file in the external storage, the number of the key/data pairs to be reloaded for each special partition type (each range of the hash bucket size) (block 1104).

Figure 12:
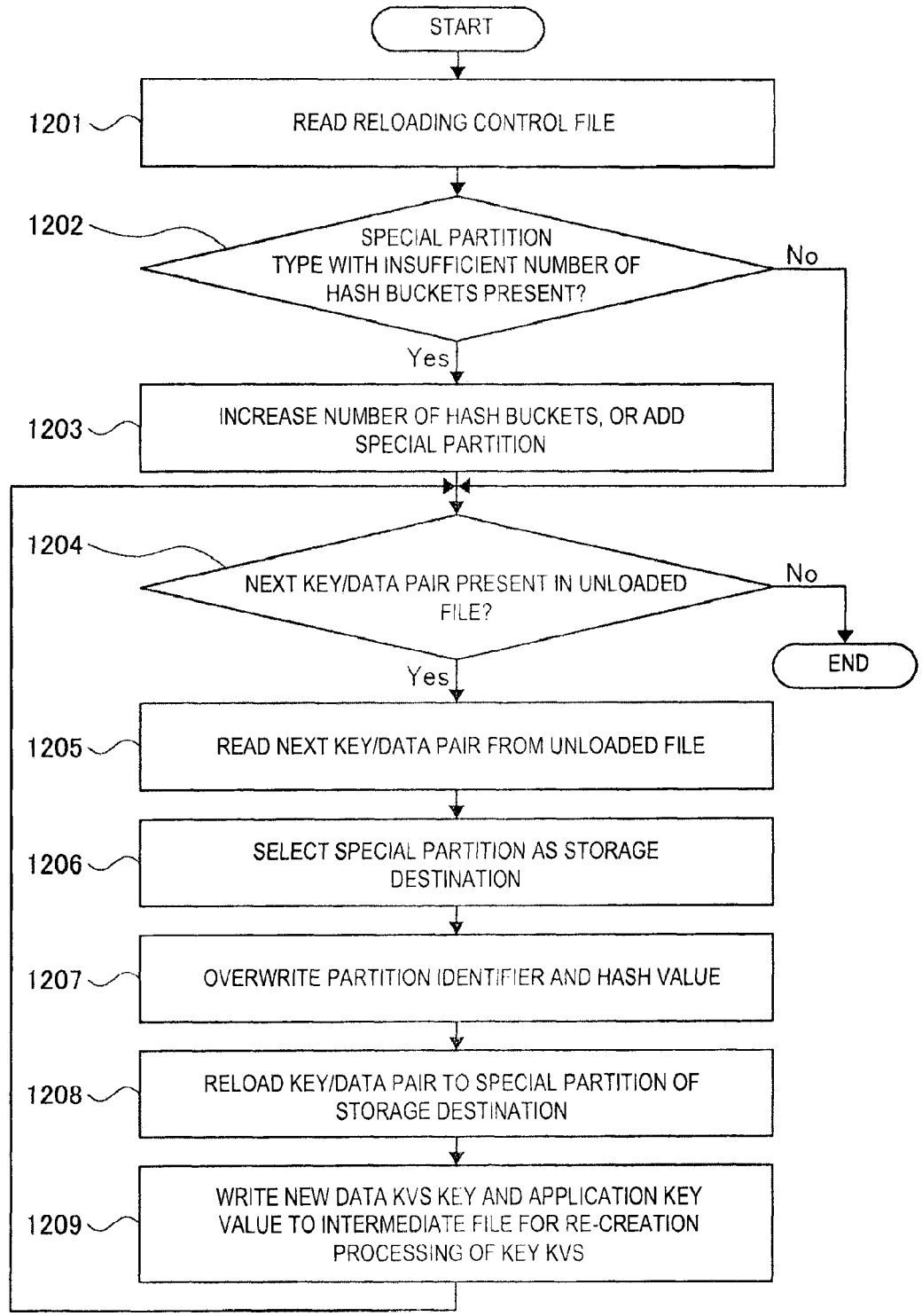
FIG. 12 is a flowchart illustrating processing when reloading the key/data pairs in the reorganization processing of the database definition of the data KVS by the data KVS definition reorganization unit in accordance with an embodiment.

FIG. 12 is a flowchart illustrating the processing when reloading the key/data pairs in the reorganization processing of the database definition of the data KVS 112 by the data KVS definition reorganization unit 170. In order to reload the key/data pairs to the data KVS 112, the data KVS definition reorganization unit 170 first reads the reloading control file (block 1201), and checks whether or not the number of the hash buckets of the data KVS 112 is insufficient for the number of the key/data pairs to be reloaded for each special partition type (block 1202). Then, when there is the special partition type with hash bucket insufficiency, the data KVS definition reorganization unit 170 increases the number of the hash buckets of the existing special partition 112b corresponding to the special partition type, or adds the special partition 112b of the same special partition type (block 1203).

Next, if there is any unprocessed key/data pair in the unloaded file, the data KVS definition reorganization unit 170 selects one key/data pair to be reloaded from the unloaded file (blocks 1204, 1205), and selects a special partition 112b as the storage destination according to the data length of the selected key/data pair (block 1206). Then, the data KVS definition reorganization unit 170 overwrites the value of the partition identifier field (for instance, the field for recording the partial value 10b of the data KVS key illustrated in FIG. 2) of the data KVS key in the key/data pair with the partition identifier of the selected special partition 112b. Also, the data KVS definition reorganization unit 170 overwrites the hash value field (for instance, the field for recording the partial value 10c of the data KVS key illustrated in FIG. 2) of the data KVS key with a sequence number in the order of storing in each special partition 112b of the storage destination (block 1207).

Next, by using the key value for which the value of the partition identifier field and the value of the hash value field are updated in the above-described manner, the data KVS definition reorganization unit 170 reloads the key/data pair to the special partition 112b of the storage destination (block 1208). Then, the data KVS definition reorganization unit 170 writes the new data KVS key and the application key value included in the data part in the reloaded key/data pair to a record of the intermediate file for the re-creation processing of the key KVS 111 (block 1209).

Next, the data KVS definition reorganization unit 170 returns to block 1204 and determines whether or not the end of the unloaded file is reached. Then, when the end of the unloaded file is not reached, the next record is read by advancing to block 1205, and the processing to block 1209 is repeated. On the other hand, when the end of the unloaded file is reached, reorganization of the database definition of the data KVS 112 is ended. Thereafter, using the intermediate file created accompanying reloading of the key/data pairs, the re-creation processing of the key KVS 111 by the key KVS re-creation unit 160 described above is performed. Since it makes the data part of the key/data pair of the key KVS 111 also be updated as the data KVS key value of the relocated key/data pair is updated, relationship between the application key value and the application data is maintained.

<Hardware Configuration Example>

Figure 13:
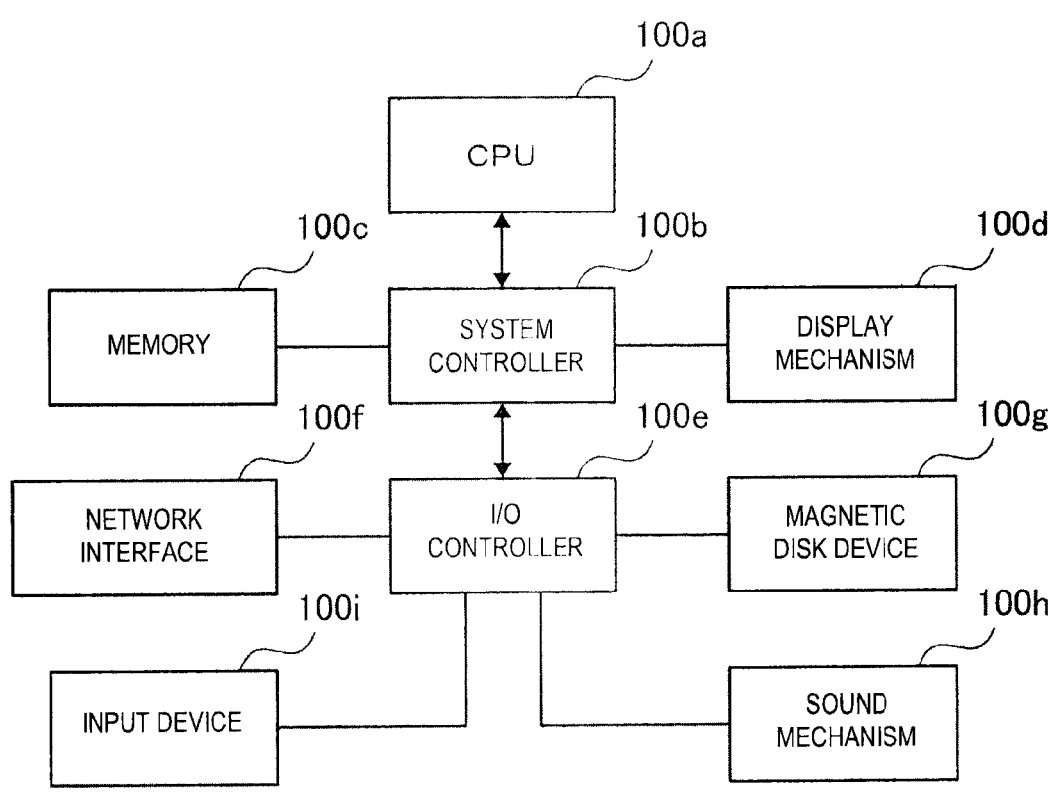
FIG. 13 is a diagram illustrating a hardware configuration example suitable for configuring the KVS system in accordance with an embodiment.

FIG. 13 is a diagram illustrating a hardware configuration example suitable for configuring the KVS system 100 of the present embodiment. Here, the case of application to a computer will be described. The computer illustrated in FIG. 13 includes a CPU (Central Processing Unit) 100a which is a computer processor, and a memory 100c which is the main computer storage device, and also includes, as external devices, a magnetic disk device (HDD or Hard Disk Drive) 100g, a network interface 100f, a display mechanism 100d including a display device, a sound mechanism 100h, and an input device 100i such as a keyboard or a mouse or the like.

In the configuration example illustrated in FIG. 13, the memory 100c and the display mechanism 100d are connected to the CPU 100a through a system controller 100b. Also, the network interface 100f, the magnetic disk device 100g, the sound mechanism 100h and the input device 100i are connected with the system controller 100b through an I/O controller 100e. Individual components are connected by various kinds of buses such as a system bus and an input/output bus.

FIG. 13 just exemplifies a hardware configuration of the computer suitable for the application of the present embodiment. The present embodiment is widely applicable to an information processor capable of displaying an electronic document so as to make it browsable, and searching data on the basis of a search key, and the embodiment is achieved not only in the configuration illustrated in the diagram.

In FIG. 13, in the magnetic disk device 100g, a program of an OS and an application program are stored. Then, the programs are read to the memory 100c and executed by the CPU 100a, thereby achieving individual functions of the KVS system 100 in the present embodiment. Also, the data management unit 110 is achieved by a storage device, such as the memory 100c and the magnetic disk device 100g or the like. The KVS system 100 can be configured by distributing the data management unit 110 and the functions to the plurality of computers. In the case of such a configuration, the individual computers can be each turned to a hardware configuration illustrated in FIG. 13.

In the above-described embodiment, the normal partition 112a is a hash bucket type, and the storage destination of the key/data pair is determined by the hash mechanism, however, the normal partition 112a is not limited to the configuration. For instance, similarly to the special partition 112b, the key/data pair can be stored in order from the first free space. In addition, various changes or improvements of the above-described embodiment are included in the technical scope of this disclosure.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system of managing data, comprising:
   a memory having computer readable instructions; and
   a processor for executing the computer readable instructions, the computer readable instructions including instructions for:
      storing and managing a set of data and a key uniquely associated with the data; and
      an access management unit for receiving an access request for accessing the data associated with the key, the access request being made by specifying the key,
      wherein the data management unit includes:
         a first storage unit storing a set of data and a first key, the first key serving as a key uniquely associated with the data, the first key including information on a storage location of the data to be accessed,
         a second storage unit storing a set of the first key and a second key, the first key serving as data, the second key serving as a key uniquely associated with the first key, the second key being specified in the access request when accessing the data associated with the first key,
         a relocation unit for relocating the set of the data and the first key in the first storage unit in a different area of the first storage unit, when a predetermined execution condition is satisfied,
         the first storage unit includes:
            a first area where a size of a record for storing one of the sets of the data and the first key is a predetermined specific size, and
            a second area where the size of the record for storing one of the sets of the data and the first key is a size set according to the data size of the set, and
         the relocation unit relocates the set of the data and the first key, which is a relocation target object, in the second area having the record size suitable for the data size of the set.

2. The system according to claim 1, wherein, when there is no second area having the record size suitable for the data size of the set of the data and the first key to be relocated, the relocation unit adds the second area having the record size and stores the set in the record in the added second area.

3. The system according to claim 1, wherein, when, as the execution condition, the data size of the set among the sets of the data and the key stored in the first area or the second area of the first storage unit is larger than a threshold determined for the first area or the second area in which the set is stored, the relocation unit relocates the set in another second area.

4. The system according to claim 1, wherein, when, as the execution condition, a degree of collisions of a hash value identifying the storage location of the set of the data and the key in the first area of the first storage unit is greater than a predetermined threshold, the relocation unit relocates the set in the second area.

5. The system according to claim 1, further comprising
   a storage control unit for acquiring the data and the second key that are new on the basis of the access request, specifying the storage location of the data in the first area of the first storage unit, generating the first key including the information on the storage location, storing the set of the first key and the data at the specified storage location, creating the set of the acquired second key and the created first key, and storing the set in the second storage unit.

6. The system according to claim 5, wherein, when the set of the data and the first key is relocated, the relocation unit updates the first key by replacing the information on the storage location of the set, which is included in the first key, with the information on the storage location after relocation, and replaces the first key in the set of the second key and the first key associated with the relocated data, which is stored in the second storage unit, with contents updated on the basis of the storage location after the relocation.

* * * * *